US007296293B2

(12) United States Patent
Isenberg

(10) Patent No.: US 7,296,293 B2
(45) Date of Patent: Nov. 13, 2007

(54) USING A BENEVOLENT WORM TO ASSESS AND CORRECT COMPUTER SECURITY VULNERABILITIES

(75) Inventor: Henri J. Isenberg, Los Angeles, CA (US)

(73) Assignee: SYMANTEC Corporation, Cupertino, CA (US)

( * ) Notice: Subject to any disclaimer, the term of this patent is extended or adjusted under 35 U.S.C. 154(b) by 845 days.

(21) Appl. No.: 10/334,767

(22) Filed: Dec. 31, 2002

(65) Prior Publication Data

US 2004/0128530 A1    Jul. 1, 2004

(51) Int. Cl.
G06F 21/00  (2006.01)
(52) U.S. Cl. ....................................................... 726/25
(58) Field of Classification Search .................. 726/25
See application file for complete search history.

(56) References Cited

U.S. PATENT DOCUMENTS

| | | | |
|---|---|---|---|
| 5,440,723 A | 8/1995 | Arnold et al. | |
| 5,452,442 A | 9/1995 | Kephart | |
| 5,473,769 A | 12/1995 | Cozza | |
| 5,572,590 A | 11/1996 | Chess | |
| 5,696,822 A | 12/1997 | Nachenberg | |
| 5,715,174 A | 2/1998 | Cotichini et al. | |
| 5,715,464 A | 2/1998 | Crump et al. | |
| 5,758,359 A | 5/1998 | Saxon | |
| 5,812,763 A | 9/1998 | Teng | |
| 5,889,943 A | 3/1999 | Ji et al. | |
| 5,951,698 A | 9/1999 | Chen et al. | |
| 5,956,481 A | 9/1999 | Walsh et al. | |
| 5,960,170 A | 9/1999 | Chen et al. | |
| 5,978,917 A | 11/1999 | Chi | |
| 5,987,610 A | 11/1999 | Franczek et al. | |
| 6,052,709 A | 4/2000 | Paul et al. | |
| 6,070,244 A | 5/2000 | Orchier et al. | |
| 6,072,830 A | 6/2000 | Proctor et al. | |

(Continued)

FOREIGN PATENT DOCUMENTS

EP    1 280 039 A    1/2003

(Continued)

OTHER PUBLICATIONS

Bontchev, Vesselin, "Are 'Good' Computer Viruses Still a Bad Idea?", 1994, pp. 1-23, obtained from http://www.people.frisk-software.com/~bontchev/papers/goodvir.html.*

(Continued)

*Primary Examiner*—Emmanuel L. Moise
*Assistant Examiner*—Jeffrey Popham
(74) *Attorney, Agent, or Firm*—Fenwick & West LLP

(57) ABSTRACT

Methods, systems, and computer readable media utilize a benevolent worm (100) to assess computer security vulnerabilities, and to correct computer security vulnerabilities. A benevolent worm (100) attempts (301) to copy itself to a computer (201), in order to assess (303) potential security vulnerabilities of the computer (201). The benevolent worm (100) communicates information (203) concerning at least one security vulnerability of a computer (201) to a benevolent worm controller (205). The benevolent worm (100) can determine (1003) that a computer (201) has at least one security vulnerability which allowed installation of the benevolent worm (100). The benevolent worm (100) can correct (1005) at least one security vulnerability of the computer (201).

41 Claims, 14 Drawing Sheets

U.S. PATENT DOCUMENTS

| | | | |
|---|---|---|---|
| 6,088,803 | A | 7/2000 | Tso et al. |
| 6,094,731 | A | 7/2000 | Waldin et al. |
| 6,104,872 | A | 8/2000 | Kubota et al. |
| 6,108,799 | A | 8/2000 | Boulay et al. |
| 6,167,434 | A | 12/2000 | Pang |
| 6,192,379 | B1 | 2/2001 | Bekenn |
| 6,199,181 | B1 | 3/2001 | Rechef et al. |
| 6,275,938 | B1 | 8/2001 | Bond et al. |
| 6,338,141 | B1 | 1/2002 | Wells |
| 6,357,008 | B1 | 3/2002 | Nachenberg |
| 6,370,648 | B1 | 4/2002 | Diep |
| 6,493,007 | B1 | 12/2002 | Pang |
| 6,535,891 | B1 | 3/2003 | Fisher et al. |
| 6,552,814 | B2 | 4/2003 | Okimoto et al. |
| 6,611,925 | B1 | 8/2003 | Spear |
| 6,622,150 | B1 | 9/2003 | Kouznetsov et al. |
| 6,678,734 | B1 | 1/2004 | Haatainen et al. |
| 6,697,950 | B1 | 2/2004 | Ko |
| 6,721,721 | B1 | 4/2004 | Bates et al. |
| 6,748,534 | B1 | 6/2004 | Gryaznov et al. |
| 6,763,462 | B1 | 7/2004 | Marsh |
| 6,813,712 | B1 | 11/2004 | Luke |
| 6,851,057 | B1 | 2/2005 | Nachenberg |
| 6,910,134 | B1 | 6/2005 | Maher et al. |
| 6,931,441 | B1* | 8/2005 | Roden et al. ............... 709/223 |
| 2002/0004908 | A1 | 1/2002 | Galea |
| 2002/0035696 | A1 | 3/2002 | Thacker |
| 2002/0046275 | A1 | 4/2002 | Crosbie et al. |
| 2002/0083175 | A1 | 6/2002 | Afek et al. |
| 2002/0091940 | A1 | 7/2002 | Wellborn et al. |
| 2002/0157008 | A1 | 10/2002 | Radatti |
| 2002/0162015 | A1 | 10/2002 | Tang |
| 2002/0178374 | A1 | 11/2002 | Swimmer et al. |
| 2003/0023865 | A1 | 1/2003 | Cowie et al. |
| 2003/0051026 | A1 | 3/2003 | Carter et al. |
| 2003/0065926 | A1 | 4/2003 | Schultz et al. |
| 2003/0115485 | A1 | 6/2003 | Milliken |
| 2003/0120951 | A1 | 6/2003 | Gartside et al. |
| 2003/0126449 | A1 | 7/2003 | Kelly et al. |
| 2003/0140049 | A1 | 7/2003 | Radatti |
| 2003/0191966 | A1 | 10/2003 | Gleichauf |
| 2003/0195861 | A1* | 10/2003 | McClure et al. ............... 707/1 |
| 2003/0212902 | A1 | 11/2003 | van der Made |
| 2003/0236994 | A1* | 12/2003 | Cedar et al. ............... 713/200 |
| 2003/0236995 | A1 | 12/2003 | Fretwell, Jr. |
| 2004/0015712 | A1 | 1/2004 | Szor |
| 2004/0015726 | A1 | 1/2004 | Szor |
| 2004/0030913 | A1 | 2/2004 | Liang et al. |
| 2004/0064722 | A1* | 4/2004 | Neelay et al. ............... 713/200 |
| 2004/0158730 | A1 | 8/2004 | Sarkar |
| 2004/0162808 | A1 | 8/2004 | Margolus et al. |
| 2004/0181687 | A1 | 9/2004 | Nachenberg et al. |
| 2005/0021740 | A1 | 1/2005 | Bar et al. |
| 2005/0044406 | A1 | 2/2005 | Stute |
| 2005/0132205 | A1 | 6/2005 | Palliyil et al. |
| 2005/0177736 | A1 | 8/2005 | De los Santos et al. |
| 2005/0204150 | A1 | 9/2005 | Peikari |
| 2006/0064755 | A1 | 3/2006 | Azadet et al. |

FOREIGN PATENT DOCUMENTS

| | | |
|---|---|---|
| GB | 2 364 142 A | 1/2002 |
| WO | WO 97/39399 A | 10/1997 |
| WO | WO 01/91403 A | 11/2001 |
| WO | WO 02/05072 A | 1/2002 |

OTHER PUBLICATIONS

Parkhouse, Jayne, "Pelican SafeTNet 2.0", [online] Jun. 2000, SC Magazine Product Review, [retrieved Dec. 1, 2003] Retrieved from the Internet: <URL: http://www.scmagazine.com/standalone/pelican/sc_pelican.html>.

Szor, P. and Ferrie, P., "Hunting for Metamorphic", Virus Bulletin Conference, Sep. 2001, Virus Bulletin Ltd., The Pentagon, Abingdon, Oxfordshire, England, pp. 123-144.

"News Release—Symantec Delivers Cutting-Edge Anti-Virus Technology with Striker32", Oct. 1, 1999, 2 pages, [online]. Retrieved on Nov. 11, 2003. Retrieved from the Internet:<URL:http://www.symantec.com/press/1999/n991001.html>. Author unknown.

Szor, P. and Ferrie, P., Attacks on Win32, Virus Bulletin Conference, Sep. 1998, Virus Bulletin Ltd., The Pentagon, Abingdon, Oxfordshire, England, pp. 57-84.

Szor, P. and Ferrie, P., "Attacks on Win32 Part II", Virus Bulletin Conference, Sep. 2000, Virus Bulletin Ltd., The Pentagon, Abingdon, Oxfordshire, England, pp. 47-68.

Delio, M., "Virus Throttle a Hopeful Defense", Wired News, Dec. 9, 2002, retrieved from Internet Http://www.wired.com/news/print/0,1294,56753,00.html Jan. 7, 2003.

"System File Protection and Windows ME", [online], last updated Dec. 4, 2001, [retrieved on Apr. 9, 2002] Retrieved from the Internet: <URL: http://www.Microsoft.com/hwdev/archive/sfp/winME_sfpP.asp>.

"Description of Windows 2000 Windows File Protection Feature (Q222193)", [online], first published May 26, 1999, last modified Jan. 12, 2002, [retrieved on Apr. 9, 2002] Retrieved from the Internet <URL: http://support.microsoft.com/default.aspx?scid=kb:EN-US;q222193>.

"Software: Windows ME; Windows ME and System File Protection", [online] last updated Mar. 11, 2002, [retrieved on Apr. 9, 2002] Retrieved from the Internet: <URL: http//www.wackyb.co.nz/mesfp.html>.

Szor, P., "Memory Scanning Under Windows NT", Virus Bulletin Conference, Sep. 1999, Virus Bulletin Ltd., The Pentagon, Abingdon, Oxfordshire, England, pp. 1-22.

Toth, et al "Connection-history based anomaly detection" Proceedings of the 2002 IEEE Workshop on Information Assurance and Security. West Point, NY, Jun. 17-19, 2002. pp. 30-35.

Kephart, Jeffrey et al., "An Immune System For Cyberspace" IBM Thomas J. Watson Research Center, IEEE 1997, pp. 879-884.

Symantec Corporation, "Norton AntiVirus Corporate Edition", 1999, Version 1, pp. 15,22.

Bakos et al., "Early Detection of Internet Work Activity by Metering ICMP Destination Unreachable Activity.", Proc. Of SPIE Conference on Sensors, and Command, Control, Communications and Intelligence, Orlando, Apr. 2002.

* cited by examiner

USING A BENEVOLENT WORM TO ASSESS AND CORRECT COMPUTER SECURITY VULNERABILITIES

TECHNICAL FIELD

This invention pertains to the use of a benevolent computer worm to assess and correct security vulnerabilities of computers.

BACKGROUND ART

Computers are vulnerable to malicious computer code such as worms, viruses and Trojan horses. As used herein, "malicious computer code" is any code that enters a computer without an authorized user's knowledge and/or without an authorized user's consent. A worm is a type of malicious computer code that is self-replicating. A worm makes copies of itself, and spreads from one computer to another. Various measures can be taken to protect computers from "infection" by worms and other malicious computer code, but sometimes network administrators and/or individual users neglect to take some or all of these measures, thereby leaving computers vulnerable. On a large network it can be prohibitively labor intensive to manually determine which computers are vulnerable.

In addition to spreading across a network from one computer to another, malicious computer code such as a worm can execute harmful functionality, for example deleting files, sending unauthorized e-mails, or changing system configuration information. Although certain measures can be taken to reduce vulnerability to such threats, it can be prohibitively labor intensive to attempt to determine the extent to which specific computers on a network are vulnerable to which threats. Even where such an attempt is made, the findings tend to be imprecise and incomplete, thus preventing an efficient deployment of security solutions to vulnerable computers.

DISCLOSURE OF INVENTION

The present invention comprises methods, systems, and computer readable media for assessing computer security vulnerabilities, and for correcting computer security vulnerabilities by a benevolent worm (100). One embodiment of an inventive method comprises the steps of:

a benevolent worm (100) attempting (301) to copy itself to a computer (201), in order to assess (303) potential security vulnerabilities of the computer (201);

at least one copy of the benevolent worm (100) attempting (301) to copy itself to an additional computer (201), in order to assess (303) potential security vulnerabilities of the additional computer (201); and at least one copy of the benevolent worm (100) communicating (305) information (203) concerning at least one security vulnerability of a computer (201) to a benevolent worm controller (205).

Another embodiment of an inventive method comprises the steps of:

installing (1001) a benevolent worm (100) on a computer (201);

the benevolent worm (100) determining (1003) that the computer (201) has at least one security vulnerability which allowed installation of the benevolent worm (201); and correcting (1005) at least one security vulnerability of the computer (201).

The features and advantages described in this disclosure of invention and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

In some embodiments of the present invention, a computer worm is utilized to assess security vulnerabilities of computers. By attempting to propagate on a network, a worm can determine which computers on the network are vulnerable to infection by malicious computer code, and can even correct detected security vulnerabilities. Historically, worms have been used to enter computers without an authorized user's knowledge or consent. However, as disclosed herein, a worm can be used to assess and correct computer security vulnerabilities, with the knowledge and consent of the relevant computer administrator. Such a worm is considered to be a benevolent worm.

Figure 1:
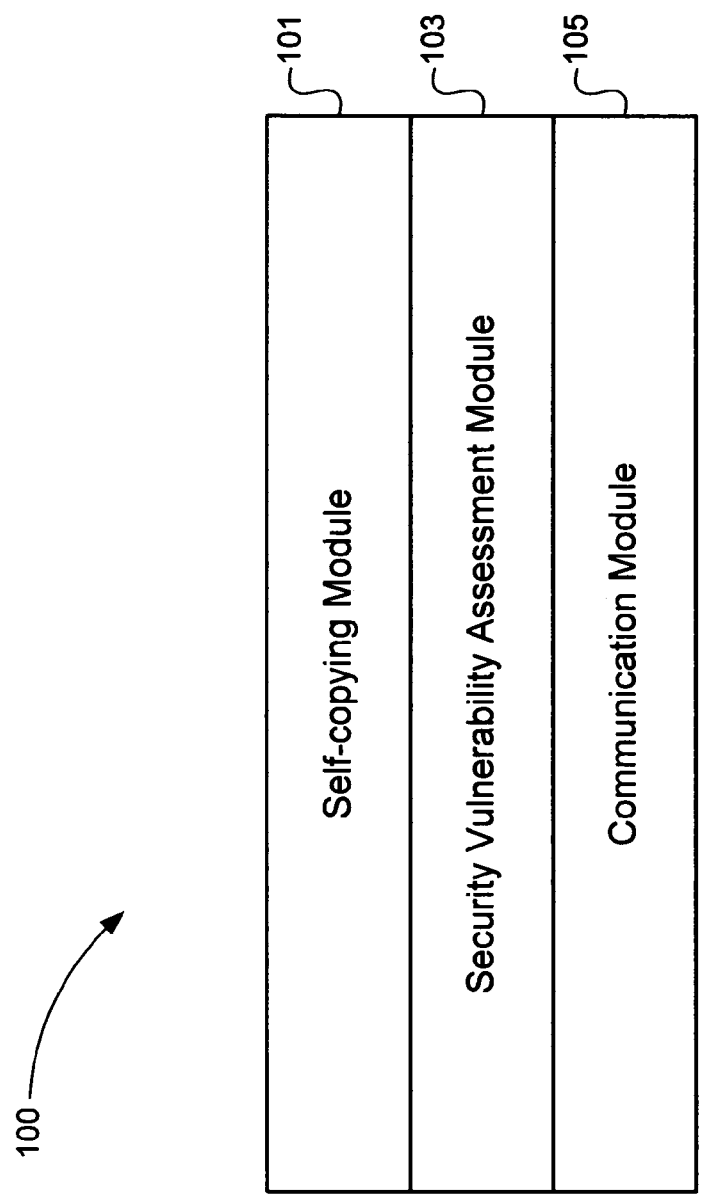
FIG. 1 is a block diagram illustrating a benevolent worm, according to one embodiment of the present invention.

FIG. 1 illustrates a benevolent worm 100 according to one embodiment of the present invention. The benevolent worm 100 illustrated by FIG. 1 includes a self-copying module 101 for creating copies of itself, a security vulnerability assessment module 103 for assessing security vulnerabilities of a computer on which the benevolent worm 100 is installed, and a communication module 105, for communicating with other programs and/or computers. In other embodiments, benevolent worms 100 have additional or different functionalities, as desired. Some examples are described in greater detail below.

Figure 2:
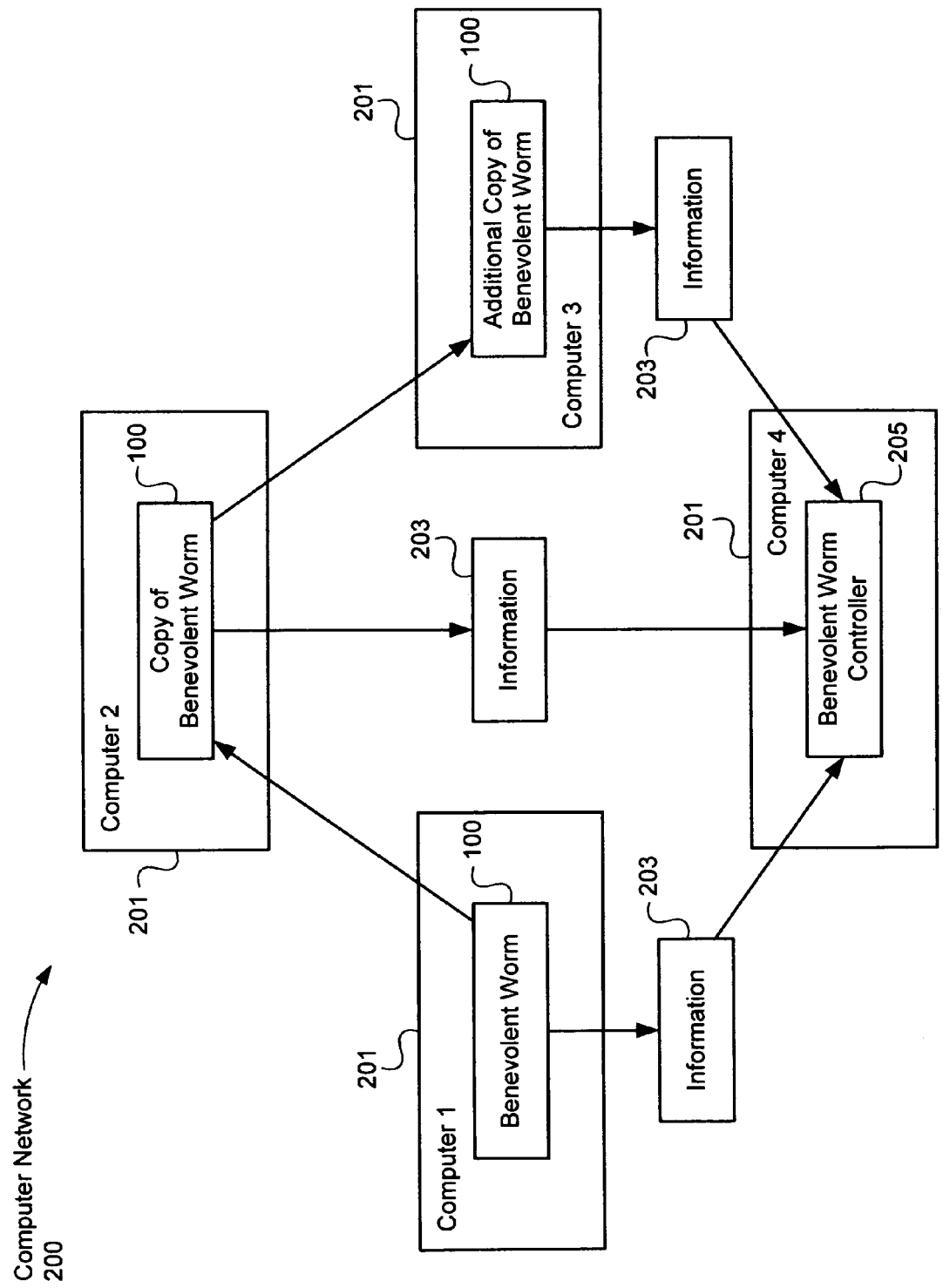
FIG. 2 is a block diagram illustrating a benevolent worm assessing security vulnerabilities of a plurality of computers, according to one embodiment of the present invention.

FIG. 2 illustrates assessing computer security vulnerabilities by a benevolent worm 100, according to one embodiment of the present invention. FIG. 2 illustrates a computer network 200 comprising four connected computers 201. Of course, computer networks 200 can include more or fewer than four connected computers 201.

A benevolent worm 100 resides on a first computer 201, and has successfully copied itself to a second computer 201. The copy of the benevolent worm 100 on the second computer 201 has also successfully copied itself to a third computer 201.

Each copy of the benevolent worm 200 communicates information 203 concerning security vulnerabilities of the computer 201 on which it resides to a benevolent worm controller 205. Although FIG. 2 illustrates a benevolent worm controller 205 residing on the fourth computer 201, it is to be understood that a benevolent worm controller 205 can reside anywhere on a network 200, as desired. In some embodiments, a benevolent worm controller 205 comprises a software program that communicates with copies of the benevolent worm 200. Benevolent worm controllers 205 are discussed in greater detail below.

Figure 3:
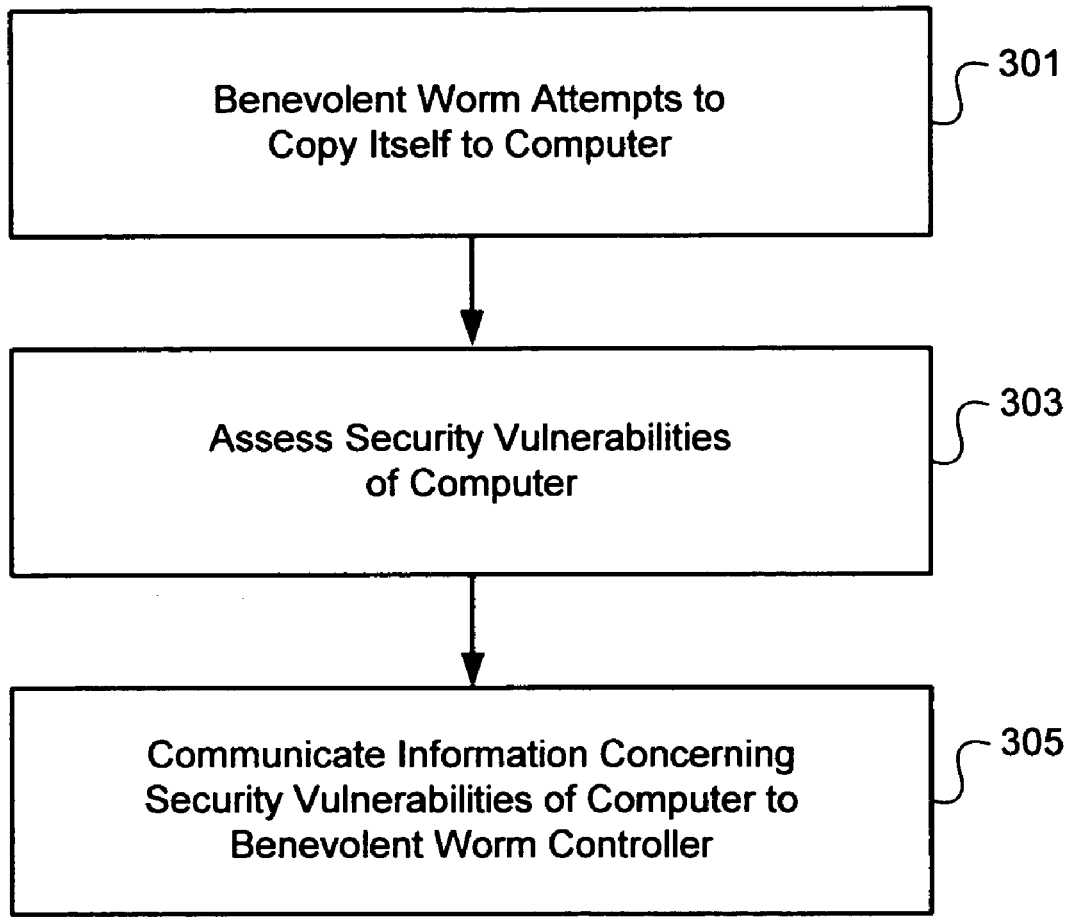
FIG. 3 is a flowchart illustrating steps for assessing security vulnerabilities of computers by a benevolent worm, according to one embodiment of the present invention.

FIG. 3 illustrates steps for assessing security vulnerabilities of computers 201 by a benevolent worm 100, according to one embodiment of the present invention. A benevolent worm 100 attempts 301 to copy itself to a computer 201. The benevolent worm 100 then assesses 303 security vulnerabilities of the computer 201. Next, the benevolent worm 100 communicates information 203 about security vulnerabilities of the computer to a benevolent worm controller 205.

It will be apparent to those of ordinary skill in the art that a benevolent worm 100 can attempt to copy itself to every computer 201 on a network 200, or only to certain computers, as desired. For example, a benevolent worm 100 can attempt to infect only computers 201 with specific network addresses or operating systems. Alternatively, a benevolent worm 100 can not attempt to infect computers 201 with specific network addresses or operating systems. Other examples will be apparent to those of ordinary skill in the relevant art.

A benevolent worm 100 can assess security vulnerabilities of a computer 201 simply by attempting to copy itself to that computer 201. If the benevolent worm 100 is able to copy itself to a computer, then the computer 201 is also vulnerable to infection by malicious worms, and other malicious code.

In some embodiments, when a benevolent worm 100 is able to copy itself to a computer 201, the benevolent worm 100 further assesses security vulnerabilities of the computer 201 by attempting to access specific resources. This is illustrated in FIG. 4.

A benevolent worm 100 resides on a computer 201, and attempts to access its resources. For example, the benevolent worm 100 can attempt to write to the computer's 201 file system 401, to access a connected computer 403 via a network connection 405, and/or to obtain super-user privileges by accessing the computer's operating system 407. The benevolent worm can also check whether anti-virus software 409 is installed on the computer 201. Of course, these are only non-exhaustive examples of system resources that the benevolent worm 100 can attempt to access in order to assess the security vulnerabilities of the computer 201. The benevolent worm 100 can check for the existence of any known security vulnerability on the computer 201, as desired.

Figure 4:
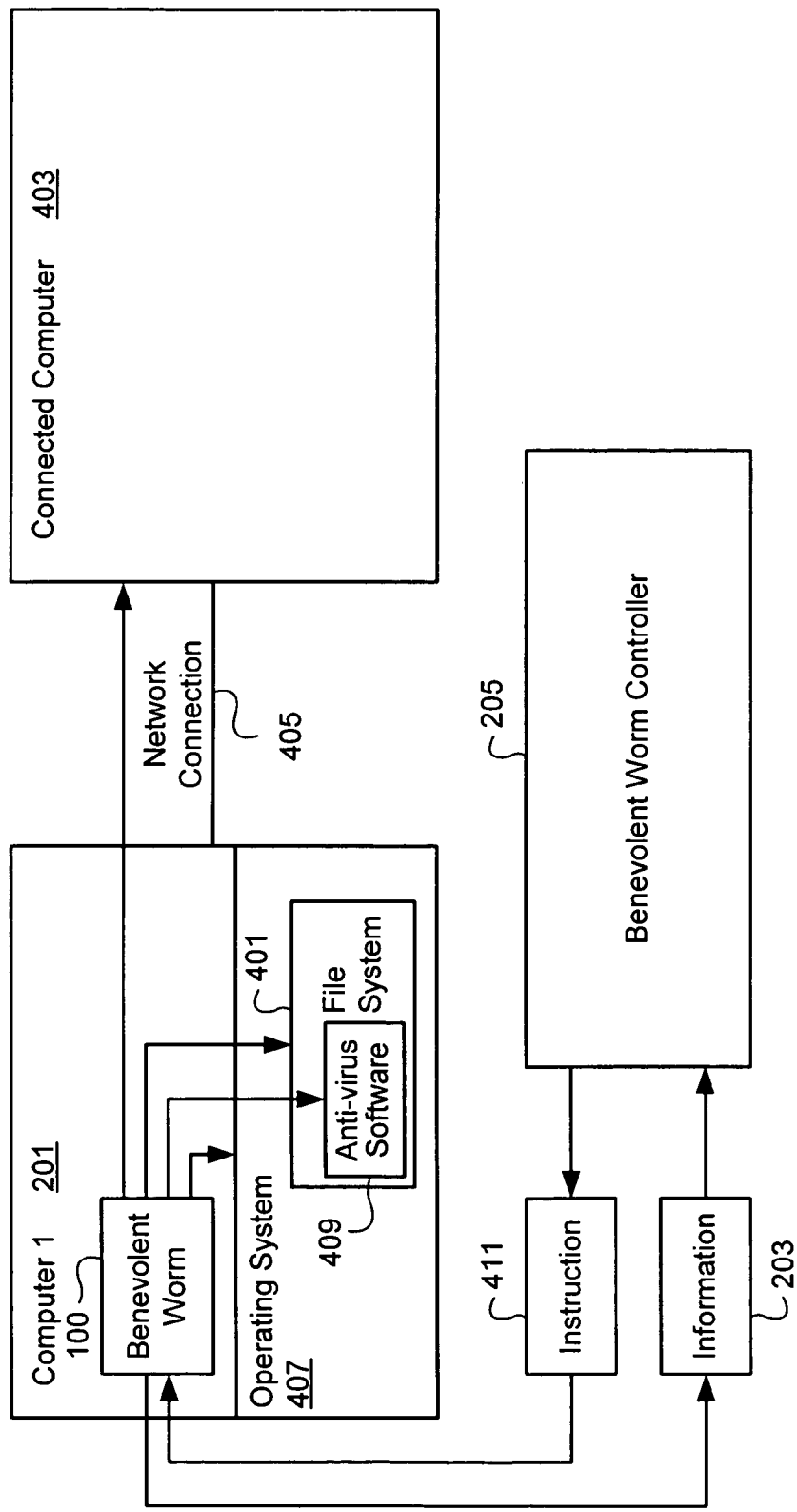
FIG. 4 is a block diagram illustrating a benevolent worm assessing security vulnerabilities of a computer by attempting to access specific resources, according to one embodiment of the present invention.

As illustrated in FIG. 4, the benevolent worm 100 can communicate information 203 concerning security vulnerabilities of the computer 201 to the benevolent worm controller 205. It will be readily apparent to those of ordinary skill in the relevant art that the data concerning security vulnerabilities communicated to the benevolent worm controller 205 can be processed and analyzed as desired.

In some embodiments, the benevolent worm 100 can also receive instructions 411 from the benevolent worm controller 205. It will be readily apparent to one of ordinary skill in the art that a wide variety of instruction 411 to control the behavior of the benevolent worm 100 are possible. Non-exhaustive examples include instructions 411 to stop replicating, to self-terminate, to attempt to infect a specific computer 201, and to not attempt to infect a specific computer 201. The benevolent worm controller 205 can be utilized to instruct and control the benevolent worm 100 as desired.

Figure 5:
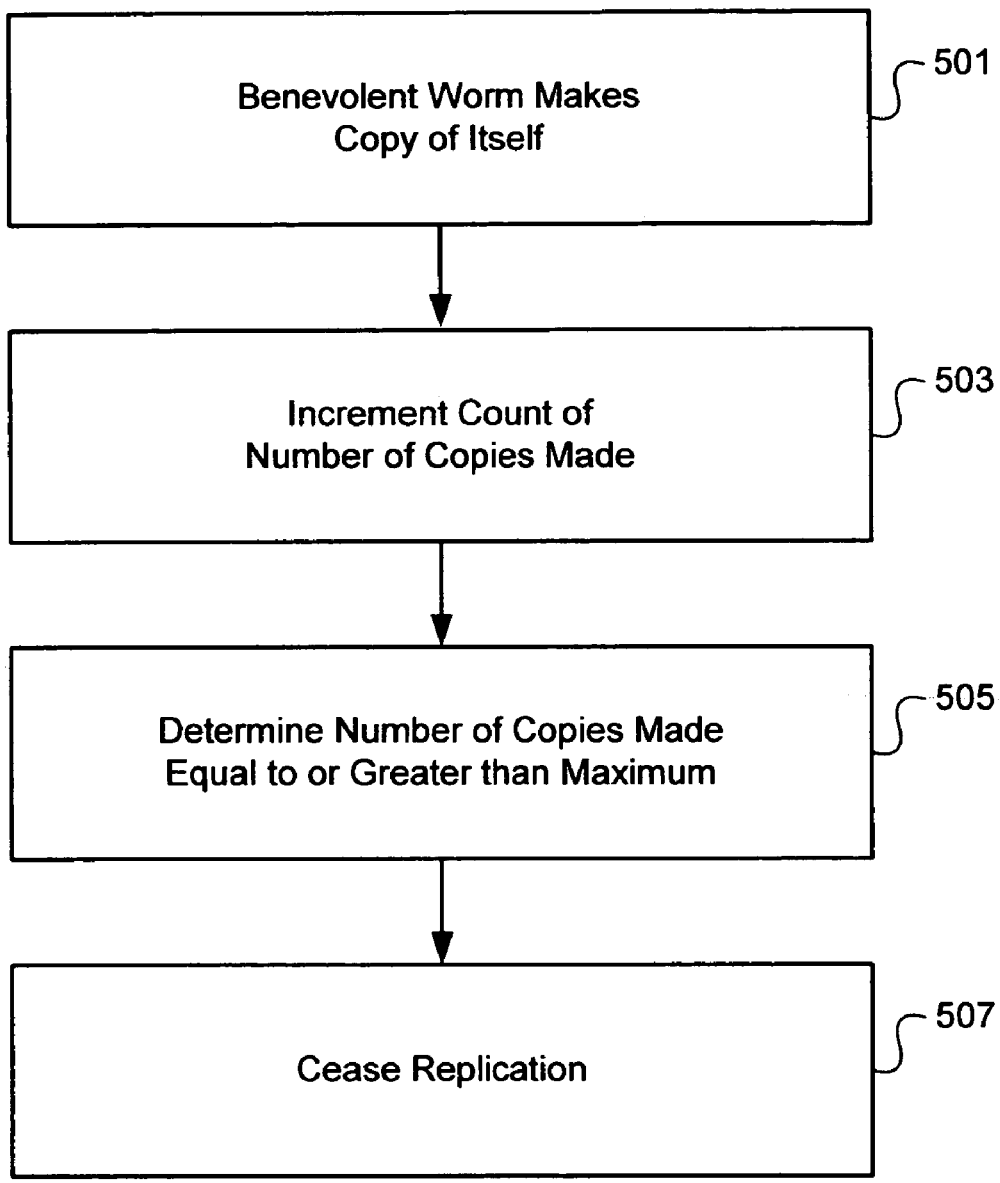
FIG. 5 is a flowchart illustrating steps for ceasing replication of the benevolent worm, according to one embodiment of the present invention.

In some embodiments, the benevolent worm 100 will only replicate a maximum number of times. The maximum number is a design variable, and can be set by an administrator as desired. FIG. 5 illustrates steps for ceasing replication of the benevolent worm 100, according to one such embodiment.

The benevolent worm 100 makes 501 a copy of itself, and increments 503 a count of the number of copies of the benevolent worm 100. In some embodiments, the count is stored by the benevolent worm controller 205, although the count can be stored in any manner so long as it is accessible to all copies of the benevolent worm 100. Various options will be apparent to ordinarily skilled artisans, such as global or static variables. Regardless of how the count is stored, if the benevolent worm 100 determines 505 that the number of copies of the benevolent worm that have been made 501 is equal to or greater than the maximum, the benevolent worm 100 ceases 507 replication.

Figure 6:
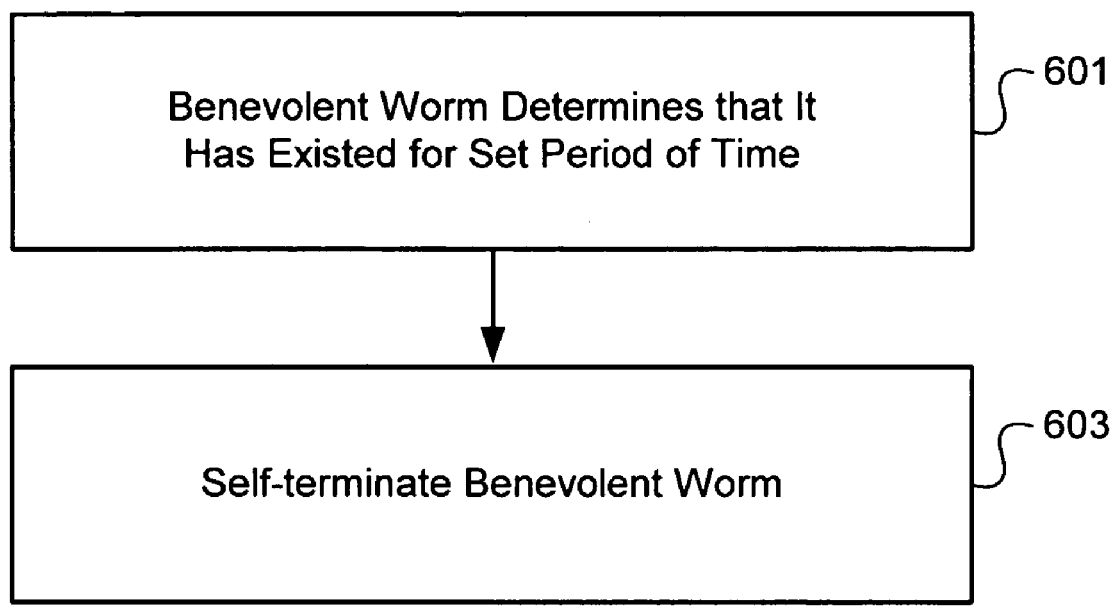
FIG. 6 is a flowchart illustrating steps for self-termination of the benevolent worm, according to one embodiment of the present invention.

FIG. 6 illustrates steps for self-termination of the benevolent worm 100 in an embodiment in which the benevolent worm is configured to exist only for a set period of time. The period of time is a design variable, and can be configured by an administrator as desired. As illustrated by FIG. 6, the benevolent worm 100 determines 601 that it has existed for a set period of time (for example, by starting a timer when it is created, and comparing the length of time that it has existed to the set period of time). Once the benevolent worm 100 has determined 601 that it has existed for a set period of time, it self-terminates 603.

Figure 7:
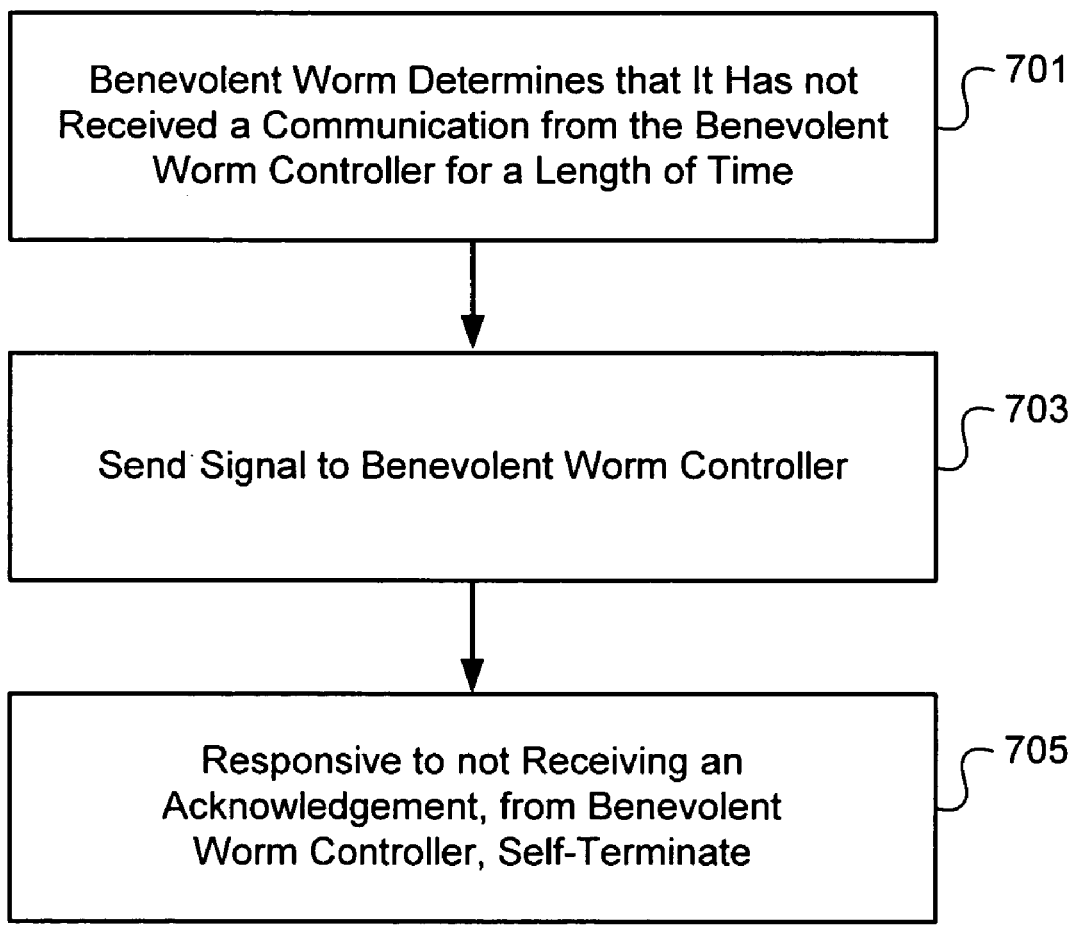
FIG. 7 is a flowchart illustrating steps for self-termination of the benevolent worm, according to another embodiment of the present invention.

In some embodiments, the benevolent worm 100 will self-terminate if it loses contact with the benevolent worm controller 205. FIG. 7 illustrates steps for self-termination of the benevolent worm 100 in such an embodiment. The benevolent worm 100 determines 701 that it has not received a communication from the benevolent worm controller 205 for a length of time. In response, the benevolent worm 100 sends a signal to the controller 205. Responsive to not receiving an acknowledgement from the controller, the benevolent worm self-terminates 701.

Figure 8:
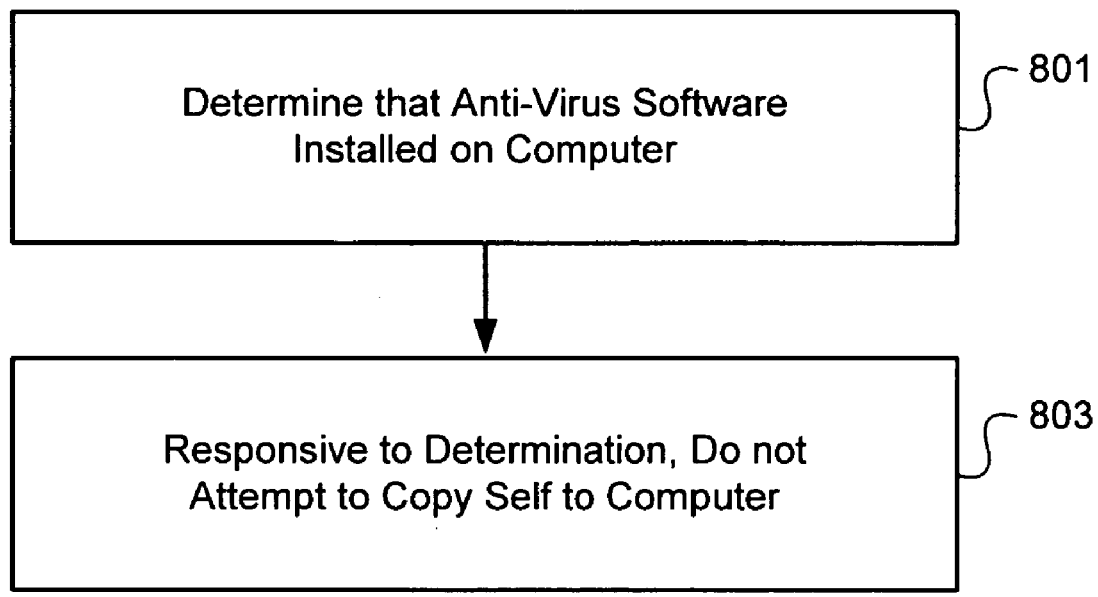
FIG. 8 is a flowchart illustrating steps for not self-copying the benevolent worm to a computer on which anti-virus software is installed, according to one embodiment of the present invention.

FIG. 8 illustrates steps for not self-copying the benevolent worm 100 to a computer 201 on which anti-virus software 409 is installed, according to one embodiment of the present invention. The benevolent worm 100 determines 801 that anti-virus software 409 is installed on a computer 201. Responsive to the determination, the benevolent worm 100 does not attempt 803 to copy itself to the computer 201.

Figure 9:
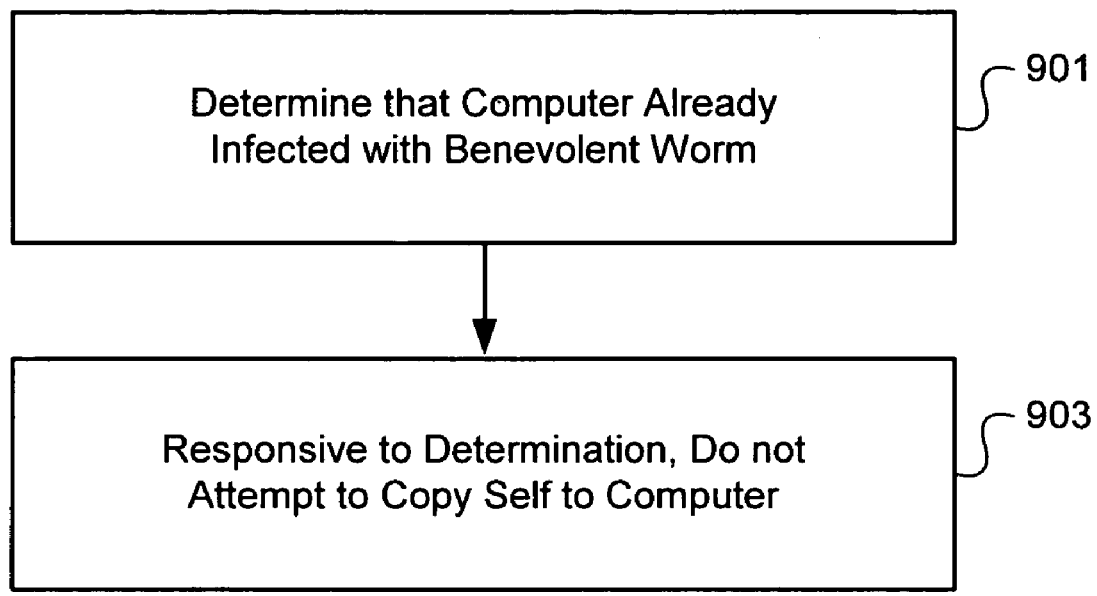
FIG. 9 is a flowchart illustrating steps for not self-copying the benevolent worm to a computer which is already infected with the benevolent worm, according to one embodiment of the present invention.

FIG. 9 illustrates steps for not self-copying the benevolent worm 100 to a computer 201 which is already infected with the benevolent worm 100, according to one embodiment of the present invention. The benevolent worm 100 determines 901 that a computer 201 has already been infected with the benevolent worm 100. Responsive to the determination, the benevolent worm 100 does not attempt 903 to copy itself to the computer 201.

Figure 10:
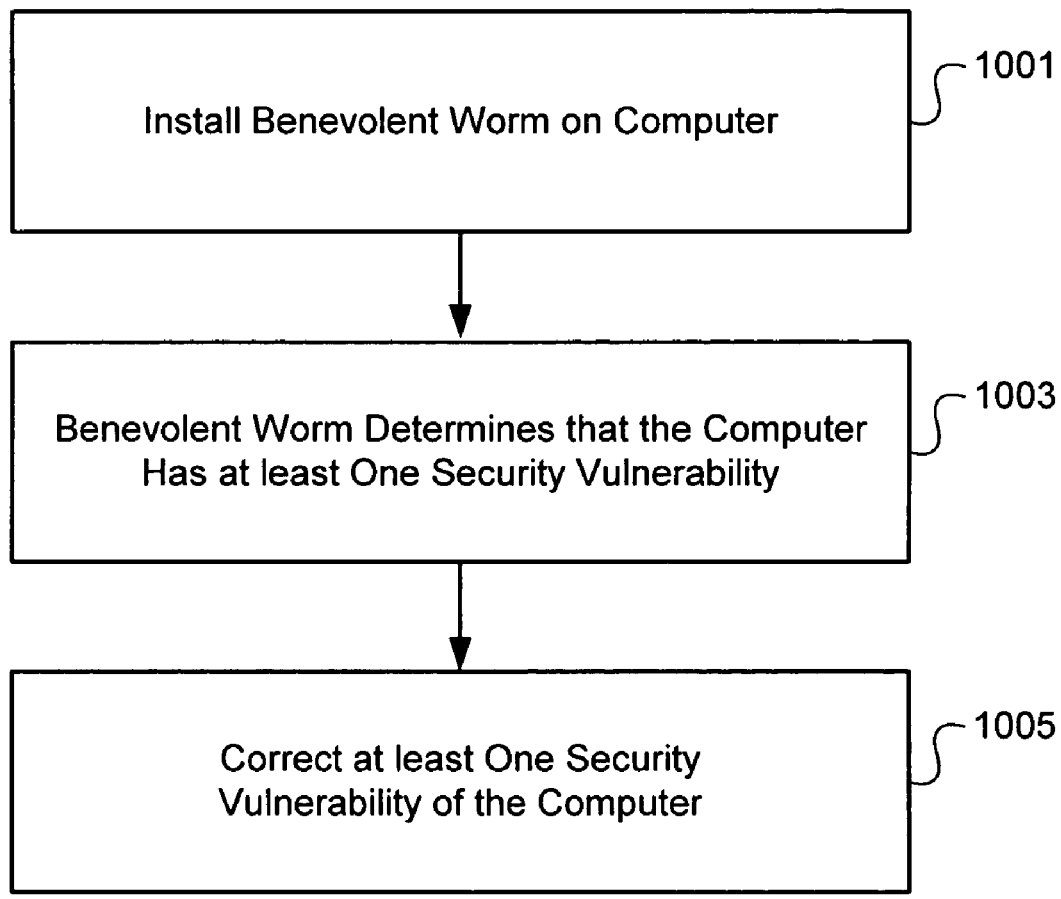
FIG. 10 is a flowchart illustrating steps for correcting detected security vulnerabilities on a computer, according to one embodiment of the present invention.

In some embodiments of the present invention, the benevolent worm 100 corrects security vulnerabilities on a computer 201 after detecting them. Steps performed in one such embodiment are illustrated by FIG. 10. A benevolent worm 100 is installed 1001 on a computer 201. The benevolent worm 100 determines 1003 that the computer 201 has at least one security vulnerability, which the benevolent worm 100 corrects 1005.

The methodology utilized to correct a security vulnerability can vary, depending upon the nature of the security vulnerability. As explained above, the fact that the benevolent worm 100 was able to install itself on a computer 201 indicates a security vulnerability, because it is desirable that computers 201 be protected from the installation of worms and other forms of malicious code. One way to so protect a computer is with anti-virus software 409. For this reason, in some embodiments of the present invention, the benevolent worm 100 checks computers 201 it is able to infect for the presence of anti-virus software 409, and installs anti-virus software 409 if it is absent.

Figure 11A:
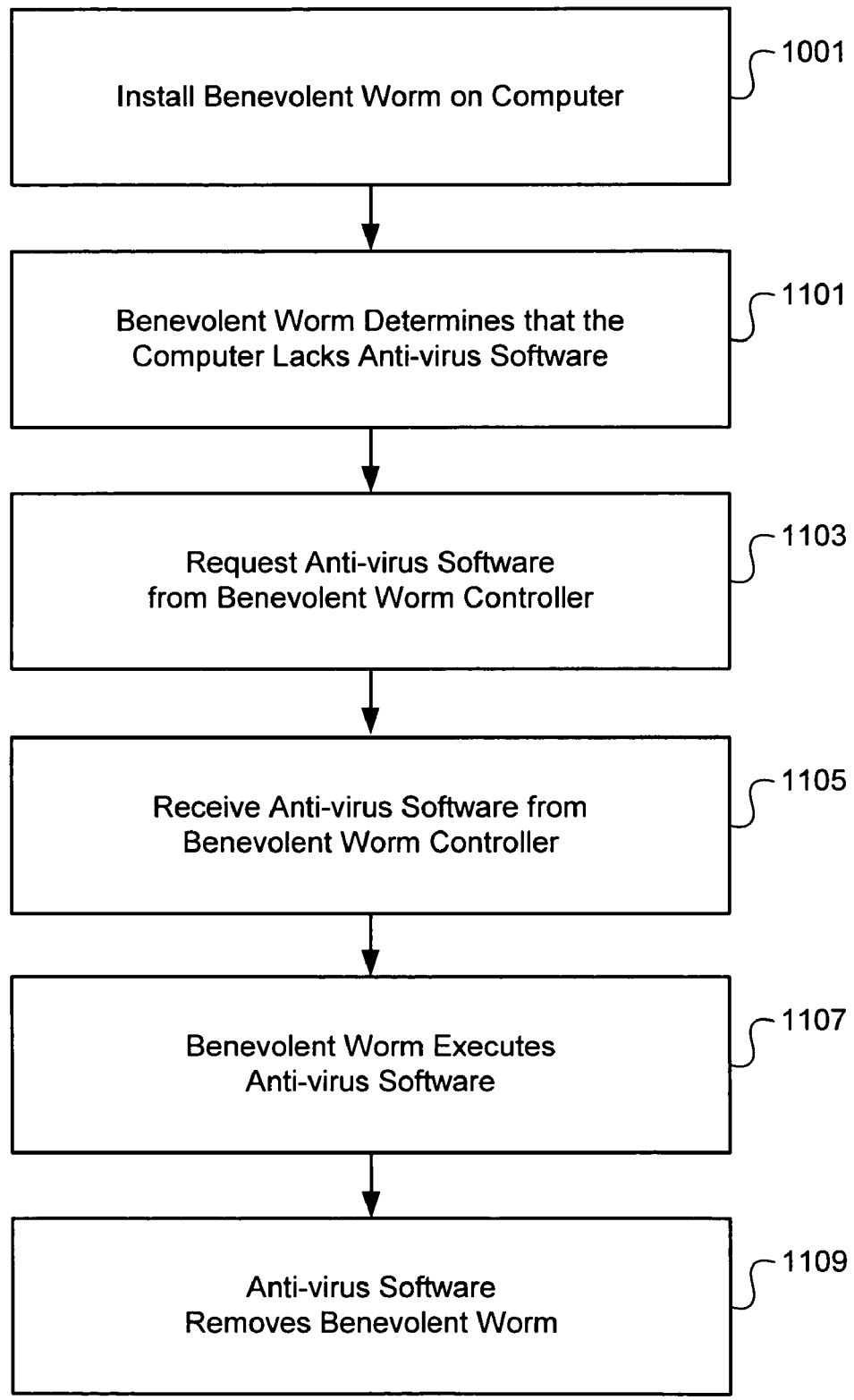
FIG. 11A is a flowchart illustrating steps for checking a computer for the presence of anti-virus software by the benevolent worm, and installing anti-virus software if it is absent, according to one embodiment of the present invention.

Steps for performing such an operation according to one embodiment of the present invention are illustrated by FIG. 11A. A benevolent worm 100 is installed 1001 on a computer 201. The benevolent worm 100 determines 1101 that the computer 201 lacks anti-virus software 409. The benevolent worm 100 requests 1103 anti-virus software 409 from the benevolent worm controller 205 (or alternatively from another source, such as an anti-virus server). The anti-virus software is received 1105 by the computer 201 from the benevolent worm controller 205. The computer now includes anti-virus software 409, which will protect it against future malicious code attacks.

In some embodiments, the benevolent worm 100 executes 1107 the anti-virus software 409 on the computer 201, and the anti-virus software 409 removes the benevolent worm 100, which is no longer needed once the security vulnerability has been corrected by the installation of the anti-virus software 409.

In another embodiment, the benevolent worm 100 determines that a computer 201 has anti-virus software 409, but that the anti-virus software 409 is not current. In that case, the benevolent worm 100 can update the anti-virus software 409, by requesting the installation of a new version or new virus signatures.

Figure 11B:
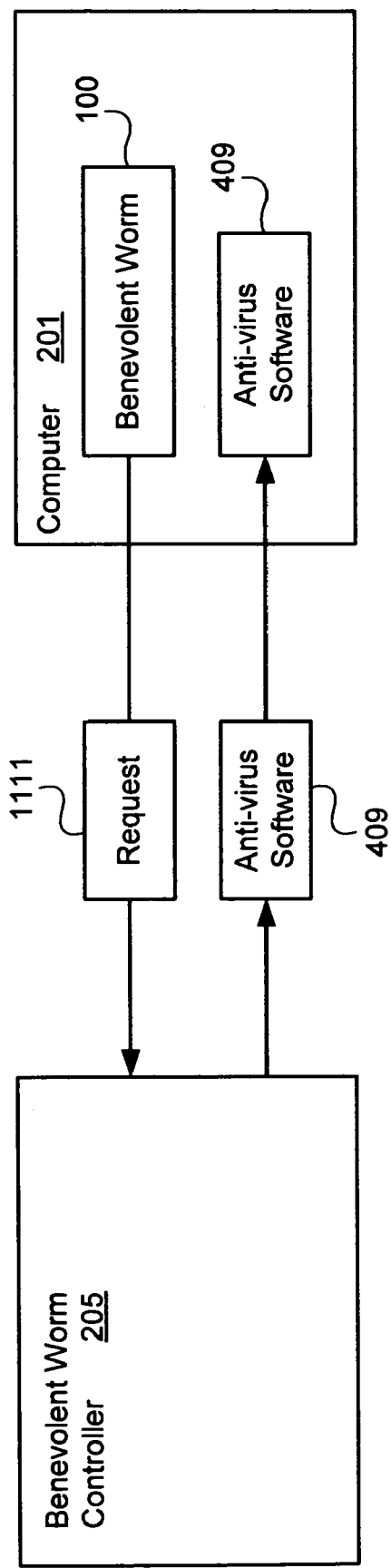
FIG. 11B is a block diagram illustrating the benevolent worm requesting anti-virus software from the benevolent worm controller, according to one embodiment of the present invention.

FIG. 11B illustrates the benevolent worm 100 requesting anti-virus software 409 from the benevolent worm controller 205, according to one embodiment of the present invention. The benevolent worm 100 is installed on a computer 201 which has lacked anti-virus software 409. The benevolent worm 100 sends a request 1111 for anti-virus software 409 to the benevolent worm controller 205. The benevolent worm controller 205 sends anti-virus software 409 to the computer 201, where it is executed by the benevolent worm 100. When the anti-virus software 409 executes, it deletes the benevolent worm 100 from the computer 201.

Figure 12:
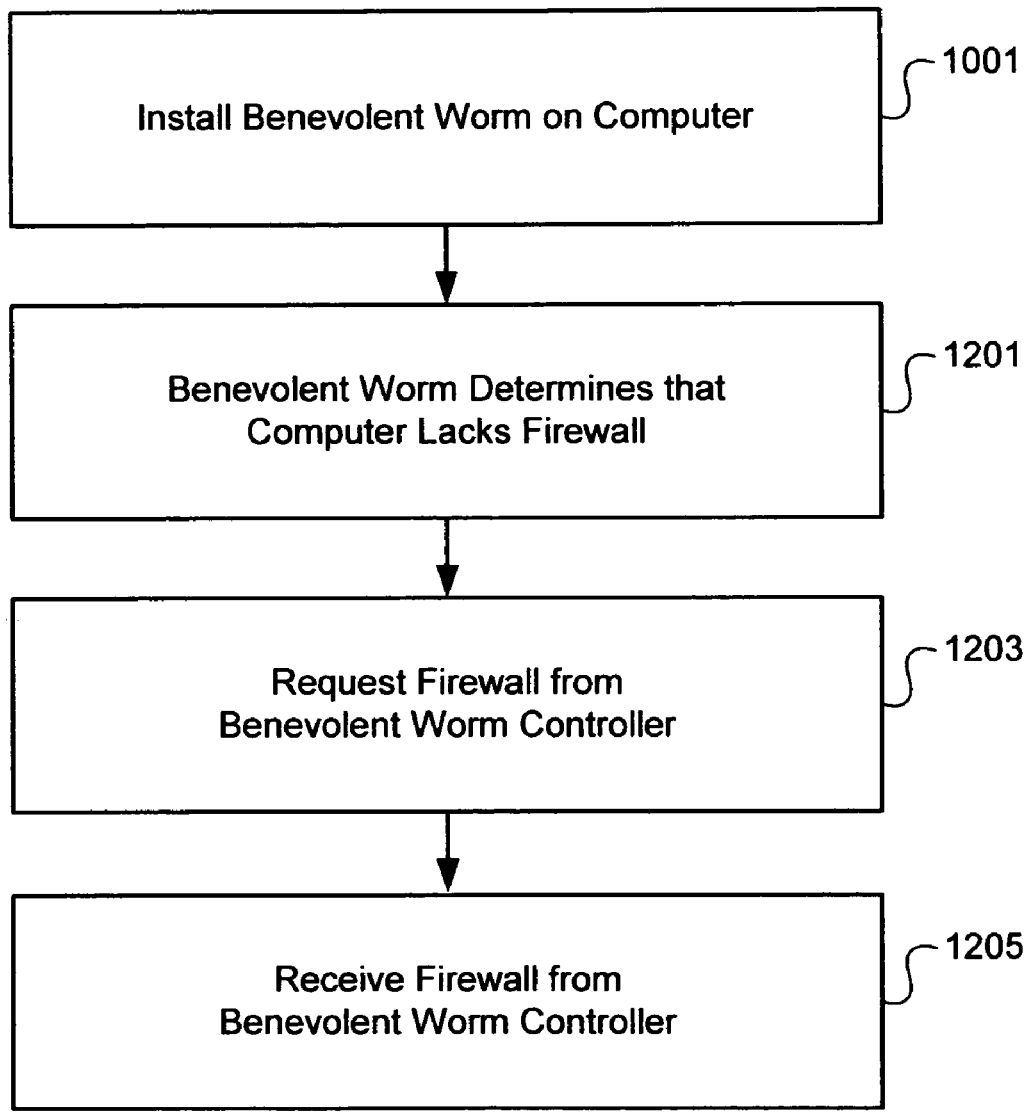
FIG. 12 is a flowchart illustrating steps for detecting the lack of a firewall on a computer by the benevolent worm, and for correcting that security vulnerability, according to one embodiment of the present invention.

Sometimes, the benevolent worm 100 will determine that a computer 201 has a security vulnerability in that the computer 201 lacks a firewall. FIG. 12 illustrates steps performed to correct such a vulnerability, according to one embodiment of the present invention.

A benevolent worm 100 is installed 1001 on a computer 201. The benevolent worm 100 determines 1201 that the computer 201 lacks a firewall. The benevolent worm 100 requests 1203 a firewall from the benevolent worm controller 205 (or alternatively from another source, such as a firewall server). The firewall is received 1205 by the computer 201 from the benevolent worm controller 205, thereby correcting the security vulnerability.

In another embodiment, the benevolent worm 100 determines that a computer 201 has a firewall, but that the firewall is not current. In that case, the benevolent worm 100 can request a firewall update for the computer 201.

It is to be understood that other types of security vulnerabilities can be detected by the benevolent worm 100, and other types of corrections can be requested from the benevolent worm controller 205, or other sources. For example, the benevolent worm 100 could detect that a computer 201 includes an old browser with a known vulnerability. In such a case, the benevolent worm 100 could request a software patch to correct the vulnerability from the benevolent worm controller 205. Detecting and/or correcting any type of computer security vulnerability by the benevolent worm is within the scope of the present invention.

It is also to be understood that in some embodiments, the benevolent worm 100 can correct security vulnerabilities without sending a request 1111 for a correction to the benevolent worm controller 205 or other destination. For example, the benevolent worm could detect that a computer 201 is vulnerable to attack because the computer 201 is not properly configured. In such a case, the benevolent worm 100 could correct the vulnerability by modifying the configuration information of the computer 201.

Figure 13:
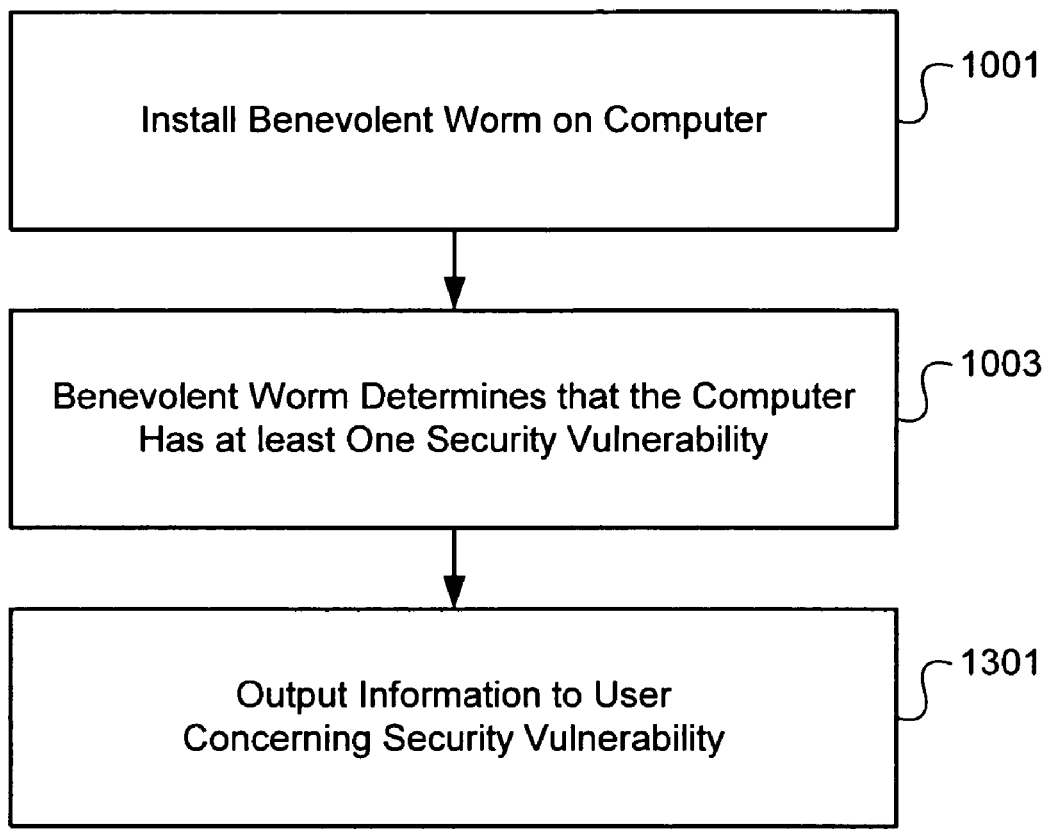
FIG. 13 is a flowchart illustrating steps for outputting information concerning a detected security vulnerability to a user, according to one embodiment of the present invention.

In some embodiments, the benevolent worm 100 can output information concerning a security vulnerability to a computer user. FIG. 13 illustrates steps for doing this, according to one embodiment of the present invention. A benevolent worm 100 is installed 1001 on a computer 201. The benevolent worm 100 determines 1003 that the computer 201 has at least one security vulnerability, about which the benevolent worm 100 outputs 1301 information to a user of the computer 201.

In some embodiments, the benevolent worm 100 outputs 1301 information concerning a security vulnerability to a computer user responsive to unsuccessfully attempting to communicate with the benevolent worm controller 205. In some instances, the benevolent worm 100 can attempt to communicate with the controller 205, for example to request a correction for a detected security vulnerability, only to discover that the controller 205 is not currently reachable. Where desired, under such circumstances the benevolent worm 100 can output 1301 information concerning a security vulnerability to a computer user, so that the user can take corrective action.

As will be understood by those familiar with the art, the invention may be embodied in other specific forms without departing from the spirit or essential characteristics thereof. Likewise, the particular naming and division of the modules, features, attributes, methodologies and other aspects are not mandatory or significant, and the mechanisms that implement the invention or its features may have different names, divisions and/or formats. Furthermore, as will be apparent to one of ordinary skill in the relevant art, the modules, features, attributes, methodologies and other aspects of the invention can be implemented as software, hardware, firmware or any combination of the three. Wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A method for assessing computer security vulnerabilities, the method comprising:
    a benevolent worm attempting to copy itself to a computer, in order to assess potential security vulnerabilities of the computer;
    the benevolent worm attempting to copy itself to an additional computer, in order to assess potential security vulnerabilities of the additional computer;
    the benevolent worm communicating information concerning at least one security vulnerability of the computer to a benevolent worm controller;
    the benevolent worm determining that it has not received a communication from the benevolent worm controller for a length of time;
    the benevolent worm sending a signal to the benevolent worm controller responsive to the determination; and
    the benevolent worm terminating itself, responsive to not receiving an acknowledgement from the benevolent worm controller.

2. The method of claim 1, the method further comprising:
    the benevolent worm determining that the benevolent worm has replicated a maximum number of times; and
    the benevolent worm not attempting further replication of itself responsive to the determination.

3. The method of claim 1, the method further comprising:
    the benevolent worm determining that the copy has existed for a set period of time; and
    the benevolent worm terminating itself responsive to the determination.

4. The method of claim 1 further comprising:
    the benevolent worm attempting to access resources of a computer; and
    the benevolent worm communicating information concerning at least one attempt to access resources of a computer to the benevolent worm controller.

5. The method of claim 4, wherein the step of attempting to access resources further comprises:
    attempting to write to a file system.

6. The method of claim 4, wherein the step of attempting to access resources further comprises:
    attempting to acquire super-user privileges.

7. The method of claim 4, wherein the step of attempting to access resources further comprises:
    attempting to access a connected computer.

8. The method of claim 4, wherein the step of attempting to access resources further comprises:
    checking for the existence of a known security vulnerability.

9. The method of claim 4, wherein the step of attempting to access resources further comprises:
    checking for the installation of known anti-virus software.

10. The method of claim 1, further comprising:
    the benevolent worm receiving an instruction from the benevolent worm controller.

11. The method of claim 10, wherein:
    the instruction from the benevolent worm controller comprises an instruction to stop replicating.

12. The method of claim 10, wherein:
    the instruction from the benevolent worm controller comprises an instruction to self-terminate.

13. The method of claim 10, wherein:
    the instruction from the benevolent worm controller comprises an instruction to attempt to infect a specific computer.

14. The method of claim 10, wherein:
    the instruction from the benevolent worm controller comprises an instruction not to attempt to infect a specific computer.

15. The method of claim 1 further comprising:
    the benevolent worm attempting to infect only those computers with specific network addresses.

16. The method of claim 1 further comprising:
    the benevolent worm not attempting to infect computers with specific network addresses.

17. The method of claim 1 further comprising:
    the benevolent worm attempting to infect only those computers running a specific operating system.

18. The method of claim 1 further comprising:
    the benevolent worm not attempting to infect computers running a specific operating system.

19. The method of claim 1, further comprising:
    a copy of the benevolent worm determining that a computer has already been infected with the benevolent worm; and
    the copy of the benevolent worm not attempting to copy itself to the computer, responsive to the determination.

20. The method of claim 1, further comprising:
    a copy of the benevolent worm determining that anti-virus software is installed on a computer; and
    the copy of the benevolent worm not attempting to copy itself to the computer, responsive to the determination.

21. A computer readable storage medium containing a computer program product for assessing computer security vulnerabilities when executed by a processor, the computer program product comprising:
    program code for attempting to copy the computer program product to remote computers on a network;
    program code for assessing potential security vulnerabilities of computers on the network;

program code for communicating, to a benevolent worm controller, information concerning security vulnerabilities of computers on the network;

program code for determining that the computer program product has not received a communication from the benevolent worm controller for a length of time;

program code for sending a signal to the benevolent worm controller responsive to such a determination, the signal indicating current status of the computer program product; and program code for causing the computer program product to terminate itself, responsive to not receiving an acknowledgement from the benevolent worm controller.

22. The computer program product of claim 21 further comprising:

program code for determining that the computer program product has replicated a maximum number of times; and program code for not attempting further replication of the computer program product, responsive to such a determination.

23. The computer program product of claim 21 further comprising:

program code for determining that the computer program product has existed for a set period of time; and program code for terminating the computer program product, responsive to such a determination.

24. The computer program product of claim 21 further comprising:

program code for attempting to access resources of a computer on which the computer program product resides; and program code for communicating, to the benevolent worm controller, information concerning at least one attempt to access resources of a computer.

25. The computer program product of claim 24, wherein the program code for attempting to access resources further comprises:

program code for attempting to write to a file system.

26. The computer program product of claim 24, wherein the program code for attempting to access resources further comprises:

program code for attempting to acquire super-user privileges.

27. The computer program product of claim 24, wherein the program code for attempting to access resources further comprises:

program code for attempting to access a connected computer.

28. The computer program product of claim 24, wherein the program code for attempting to access resources further comprises:

program code for checking for the existence of a known security vulnerability.

29. The computer program product of claim 24, wherein the program code for attempting to access resources further comprises:

program code for checking for the installation of known anti-virus software.

30. The computer program product of claim 21 further comprising:

program code for receiving an instruction from the benevolent worm controller.

31. The computer program product of claim 30, wherein: the instruction from the benevolent worm controller comprises an instruction to stop replicating.

32. The computer program product of claim 30, wherein: the instruction from the benevolent worm controller comprises an instruction to self-terminate.

33. The computer program product of claim 30, wherein: the instruction from the benevolent worm controller comprises an instruction to attempt to infect a specific computer.

34. The computer program product of claim 30, wherein: the instruction from the benevolent worm controller comprises an instruction not to attempt to infect a specific computer.

35. The computer program product of claim 21 further comprising:

program code for attempting to copy the computer program product only to those computers with specific network addresses.

36. The computer program product of claim 21 further comprising:

program code for not attempting to copy the computer program product to computers with specific network addresses.

37. The computer program product of claim 21 further comprising:

program code for attempting to copy the computer program product only to those computers running a specific operating system.

38. The computer program product of claim 21 further comprising:

program code for not attempting to copy the computer program product to computers running a specific operating system.

39. The computer program product of claim 21 further comprising:

program code for determining that the computer program product has already been installed on a computer; and program code for not attempting to copy the computer program product to the computer, responsive to such a determination.

40. The computer program product of claim 21 further comprising:

program code for determining that anti-virus software is installed on the computer; and program code for not attempting to copy the computer program product to a computer, responsive to such a determination.

41. A system for assessing computer security vulnerabilities, the system comprising:

means for attempting to copy a benevolent worm to remote computers on a network;

means for assessing potential security vulnerabilities of computers on the network;

means for communicating, to a benevolent worm controller, information concerning security vulnerabilities of computers on the network;

means for determining that the benevolent worm has not received a communication from the benevolent worm controller for a length of time;

means for sending a signal to the benevolent worm controller responsive to such a determination; and means for causing the benevolent worm to terminate itself responsive to the benevolent worm not receiving an acknowledgement from the benevolent worm controller.

* * * * *